July 14, 1964 W. HERGERT 3,140,822

METHOD AND ARRANGEMENT FOR TRANSFERRING INFORMATION BETWEEN A STORAGE AND A RECORD CARRIER

Filed July 30, 1962 4 Sheets-Sheet 1

INVENTOR

Wilhelm Hergert

BY:

Michael S. Striker

ATTORNEY

INVENTOR
Wilhelm Hergert
BY:
Michael J. Striker
ATTORNEY

INVENTOR
Wilhelm Hergert
by:
Michael S. Striker
Atty

INVENTOR
Wilhelm Hergert
BY:
Michael J. Striker
ATTORNEY

United States Patent Office 3,140,822
Patented July 14, 1964

3,140,822
METHOD AND ARRANGEMENT FOR TRANSFERRING INFORMATION BETWEEN A STORAGE AND A RECORD CARRIER

Wilhelm Hergert, Wilhelmshaven, Germany, assignor to Olympia Werke A.G., Wilhelmshaven, Germany Filed July 30, 1962, Ser. No. 213,378
Claims priority, application Germany Aug. 1, 1961
15 Claims. (Cl. 234—1)

The present invention concerns a method and an arrangement for transferring information between an information storage device and a record carrier by means of a multi-station transfer device.

A substantial number of methods and of arrangements for transferring information between different information handling devices, for instance from a storage device to a record carrier, or vice versa, is known. Among information transfer devices referred to below are perforated tape punching devices, tape transmitters or devices for reading out perforated tapes, card punching devices, devices for reading out punched cards, and devices for printing information on a record carrier. In most cases the information to be transferred is stored in code form in a storage device. By means of special read-out devices the information is taken from the storage device, in many cases thereafter decoded and then introduced into the transfer device. Similar conditions exist when the transfer is carried out in the opposite direction from a record carrier into a storage device. Many of the known transfer devices incorporate electromagnetic devices for their operation. For instance, in a perforated tape punching device selected control members are moved in response to signal currents derived from the storage device into selected positions whereby those of the punches which correspond to the particular bit of information are selected and caused to carry out the corresponding perforation. Also the punching and printing operations in such devices are usually carried out electromagnetically.

Ordinary information transfer devices consist only of one transfer station capable of transferring only one bit of information at a time although this bit may be composed of a combination of signal or marking elements. For instance, in a one-station tape perforator operating in accordance with a five-element code five punches arranged in alignment with each other transverse of the tape are provided. Similar devices are known which operate in accordance with an eight-element code. In devices for perforating punched cards even eighty punches in a row may be provided.

The operating speed of such types of transfer devices is limited because the record carrier has to be moved in steps past the stationary punching device. After each punching operation the record carrier must be moved one step forward corresponding to the desired spacing between consecutive perforations or groups of perforations and must then be stopped. Only when the tape has come to a complete standstill the next following punching operation can be carried out.

The limitation of the speed of the transfer operation depends in the first place upon the material of the record carrier. If the latter is accelerated too rapidly or is brought to a stop too rapidly then the danger exists that the feed holes tear. In addition, the speed of the transfer operation may be limited by the inertia of the punches and of other cooperating elements which must be moved in connection with the punching operations. In certain cases the limitation of the speed of the transfer operation is also due to the time required for building up and for annulling the electric and magnetic fields in the electromagnets used in carrying out the punching operation.

Similar factors play a role in the operation of printing devices. In perforators a high speed of the transfer operation makes it difficult to maintain uniform spacing between consecutive groups of perforations, and the same applies similarly in printing devices regarding the spacing between consecutive markings. Irregular spacings between consecutive perforations on a perforated tape affect unfavorably the later reading out of the information recorded by such perforations.

In order to overcome the above mentioned difficulties it has been attempted to improve the conditions by providing multi-station transfer devices, for instance perforators comprising a substantial number of perforating stations in a series so that the record carrier is perforated simultaneously by the plurality of perforating stations in a corresponding number of places.

It is a disadvantage of this type of transfer devices that the record carrier must carry out after each multiple punching operation a comparatively very large step forward which is determined by the number of punching stations and the spacing between consecutive perforations. Also in this case the record carrier is subjected to great accelerations and decelerations which are likely to damage the tape. In addition, the means for causing such movements of the record carrier are comparatively complicated and involved.

Also perforating devices of a rotary type have been proposed which however do not furnish better results. These devices are rather complicated and do not prevent inaccuracies in the spacing of the perforations.

It is therefore one of the objects of this invention to provide for a method and an apparatus which avoids the disadvantages of the known information transfer devices.

It is another object of the invention to provide for a method and an apparatus of the type set forth which are comparatively simple and avoid damage to the record carrier while nevertheless permitting of a comparatively high speed of transfer operations.

With the above objects in view the invention includes in a method of transferring by means of a multi-station information transfer device having an odd number of $n$ transfer stations with equal spaces therebetween, information composed of up to $n$ bits between a multi-station storage and an information record carrier adapted to carry bit markings and moving through said device, the spacing between adjacent ones of the bit markings representing the complete information corresponding to the spacing between adjacent transfer stations, the step of consecutively connecting, in synchronism with the movement of the record carrier past the transfer stations, the individual stations of the storage with the $n$ individual transfer stations one-by-one so as to activate the latter to effect bit-by-bit transfer of the information between the respectively connected storage and transfer stations, the sequence of said transfer stations which are thus sequentially activated being such that after the activation of the first transfer station those transfer stations are sequentially activated which are spaced from each other alternatingly $$+a=\frac{n+1}{2}$$

spaces in forward direction of the movement of the record carrier and $-b=a-1$ spaces in opposite direction, respectively, wherein $n$ is the number of said transfer stations, whereby $n$ bits of information are transferred bit-by-bit by $n$ activations of the respective transfer stations between the storage and the record carrier while the latter moves past said $n$ transfer stations.

In another aspect of the invention it includes in an information transfer arrangement including a storage device having a plurality of storage stations, a multi-station information transfer device having an odd number of $n$ transfer stations with equal spaces therebetween, an information record carrier movable through said transfer device and adapted to carry bit markings set apart from each other by spaces equal to those between said transfer stations, and means for moving said record carrier through said transfer device in a predetermined direction at a predetermined speed, for transferring information composed of up to $n$ bits between said storage device and said record carrier, in combination, circuit means between the individual stations of the storage device and the individual transfer stations, respectively, of the transfer device and including multiple-switch means changeable between a plurality of different circuit-closing conditions, for consecutively connecting, in said different conditions, the individual stations of said storage device with the $n$ individual transfer stations one-by-one so as to activate the latter to effect bit-by-bit transfer of the information between the respectively connected storage and transfer stations, the sequence of said transfer stations which are thus sequentially activated being such that after the activation of the first transfer station those transfer stations are sequentially activated which are spaced from each other, alternatingly, $$+a=\frac{n+1}{2}$$

spaces in forward direction of the movement of said record carrier, and $-b=a-1$ spaces in opposite direction, respectively, wherein $n$ is the number of said transfer stations; and actuating means synchronized with the means for moving said record carrier for changing said multiple switch means consecutively between said different conditions in synchronism with said movement of said record carrier, so that $n$ bits of information are transferred bit-by-bit by $n$ activations of the respective transfer stations between said storage device and said record carrier while the latter is moved past said $n$ transfer stations.

According to the invention a higher speed of operation of the entire information transfer arrangement and particularly a higher speed of the movement of the record carrier is obtained than that obtainable with a conventional multi-station transfer device in which a plurality of bits of information are transferred simultaneously. Nevertheless it is possible according to the invention to keep the operational speed in the individual transfer station, particularly in a perforating station lower than it is permissible in a multi-station transfer device, particularly of the punching type in which a plurality of bits of information are transferred simultaneously by perforating. A particular advantage of the invention resides in the fact that nevertheless the record carrier can be moved through a multi-station transfer device in steps.

Other advantages of the invention are listed here below.

In comparison, in conventional multi-station transfer devices in which a plurality of bits of information are transferred simultaneously by simultaneous printing or punching it is necessary to provide for a very strong and heavy common pressure head for simultaneously moving the plurality of punches or printing devices. This entails the necessity of providing for high power driving means which, if constituted by electromagnet means cause with each punching or printing operation a sudden energy demand from the feeding network, a highly undesirable effect. The greater is the number of the transfer stations that are to operate simultaneously the stronger must be the pressure head and the electromagnet. Also the inert masses to be moved are increased. The time periods required for building up and for annulling the electromagnetic fields are increased. For instance, in a multiple-station perforating arrangement having e.g. 15 punching stations, each with 8 punches for eight-element code information plus one feed hole punch the pressure head and the operating electromagnet must be strong enough so that in an extreme case in one simultaneous punching operation even $15\times9=135$ punches may be driven simultaneously through the material of the record tape.

It is evident that it is incomparably simpler to provide according to the invention for an operation in which fifteen times in consecutive order only $1/15$ is needed of the electromagnetic energy which is required in a multi-station simultaneous punching device. In addition, the operating elements of the arrangement according to the invention can be moved substantially faster than the heavy elements of a multi-station simultaneous punching device.

It should also be taken into consideration that in a heavy type multi-station simultaneous punching or printing device each operating stroke produces a very considerable noise. In contrast therewith the individual transfer stations according to the invention and therefore operating individually and consecutively produce a comparatively very little noise.

Still another favorable feature of the method and arrangement according to the invention concerns the occurrence of erroneous or wrong perforations or markings which can hardly be avoided in high speed transfer devices. In the case of such erroneous or wrong markings in a multi-station simultaneous punching or printing device the necessity arises, even if only one punch or printing member in one of the many stations thereof has been wrongly selected, to move the record carrier at least fifteen steps back, erase the marking of fifteen markings and then to start again with marking fifteen bits of information. These difficulties are avoided by the invention because if an error has occurred in only one station only the marking effected by this one station has to be corrected.

It should be noted that within the scope of the invention the transfer devices may be tape perforators or printing devices as well as perforated tape read-out devices, depending upon in which direction the information transfer has to be carried out. If the transfer device is a multi-station perforating arrangement then it is possible to arrange the individual punching stations either all on one side of the tape to be perforated, or alternatingly on opposite sides of the tape. The individual perforating stations may be stationary or, particularly if they are arranged on opposite sides of the tape, they may be equipped in a conventional manner with means for temporarily moving the individual device so as to compensate for the movement of the tape. If desired, the individual perforating stations may be of the conventional type in which the individual operated punches of the respective perforating stations act also for transporting the tape through the entire perforating arrangement.

The novel features which are considered as characteristic for the invention are set forth in particular in the appended claims. The invention itself, however, both as to its construction and it method of operation, together with additional objects and advantages thereof, will be best understood from the following description of specific embodiments when read in connection with the accompanying drawings, in which:

Figure 2:
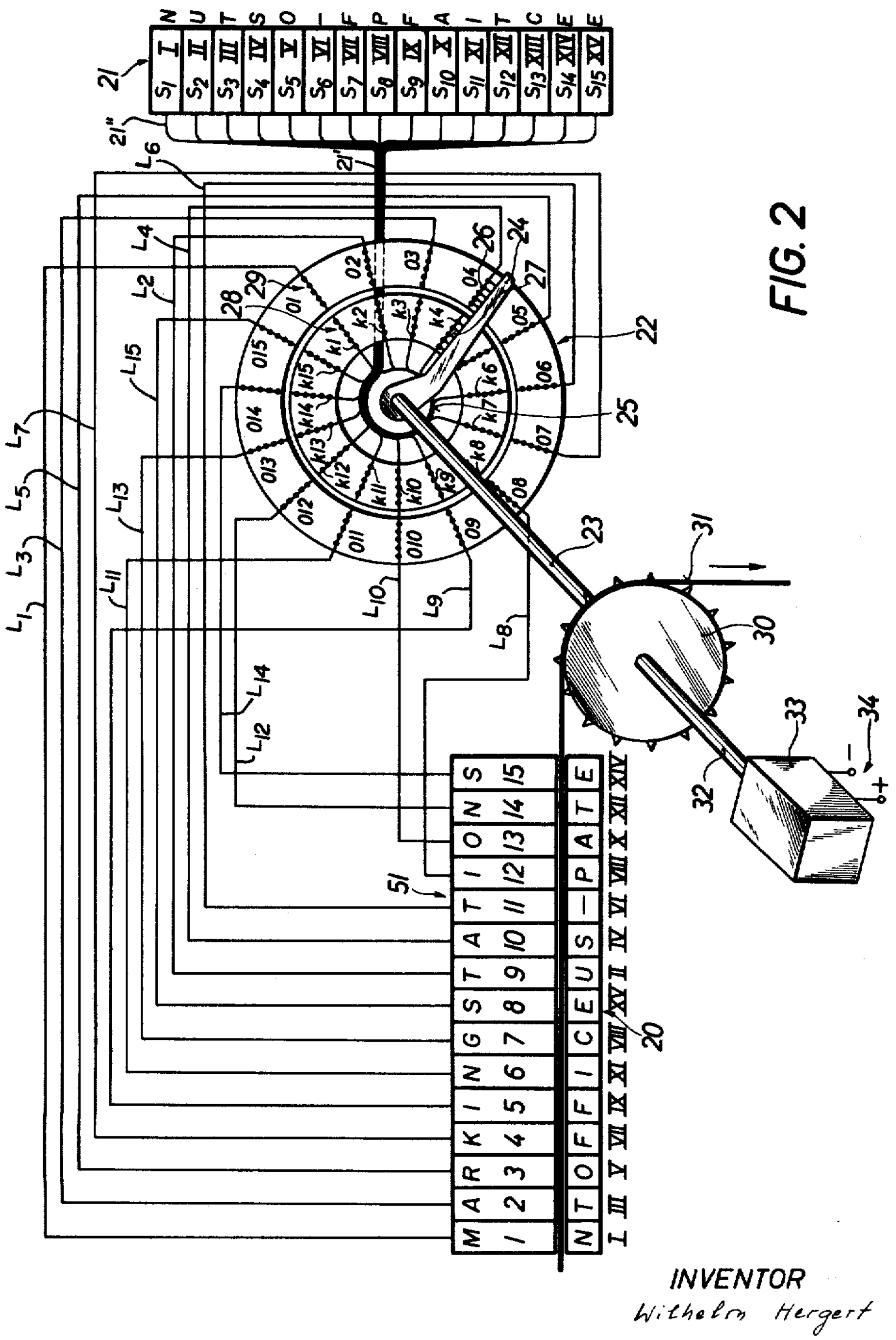
FIG. 2 is a diagrammatic illustration of one embodiment of the invention comprising a multi-station perforating arrangement.
Figure 2A:
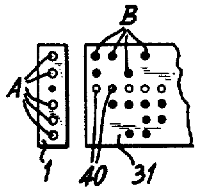
Figure 2B:
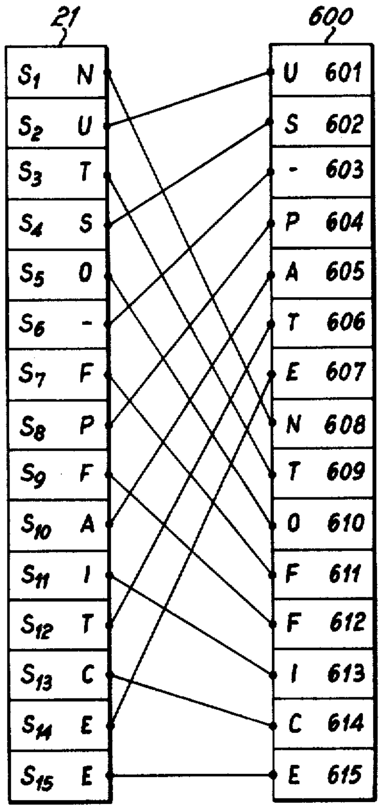
Figure 2C:
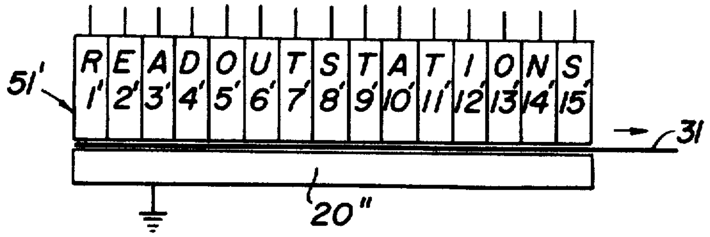
Figure 3:
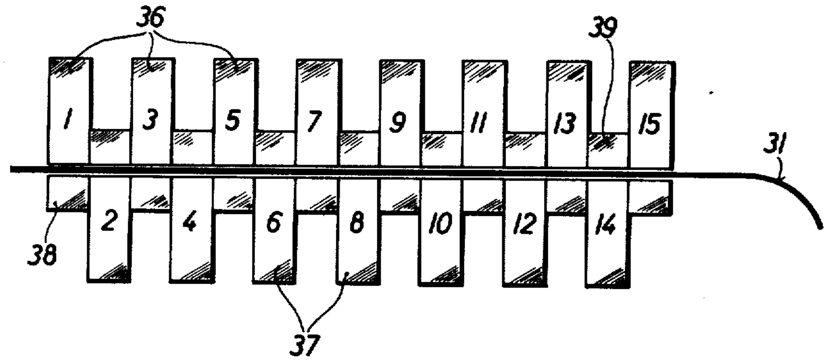

FIG. 2*a* is a diagrammatic bottom view of one perforating station and of a portion of a perforated tape;

FIG. 2*b* is a diagrammatic illustration of one form of a storage arrangement constituting a part of the arrangement according to FIG. 2;

FIG. 2*c* diagrammatically illustrates another embodiment of the invention comprising a multi-station read-out device replacing the punching arrangement according to FIG. 2; and FIG. 3 is a diagrammatic illustration of a modification of the transfer arrangement shown in FIG. 2.

It has been stated above that the invention applies to the use of transfer devices constituted by perforators as well as by printing devices for information transfer in direction to a record carrier, and also to tape read-out devices for information transfer from the record carrier. Neverthless, the following description refers mainly to an arrangement comprising a marking arrangement which may operate both by perforating or by printing, the modification including a read-out arrangement being illustrated only by FIG. 2*c*. There will be no difficulty for those skilled in the art to understand in what manner the invention can be advantageously used in connection with either one of the above mentioned transfer devices.

Figure 1:
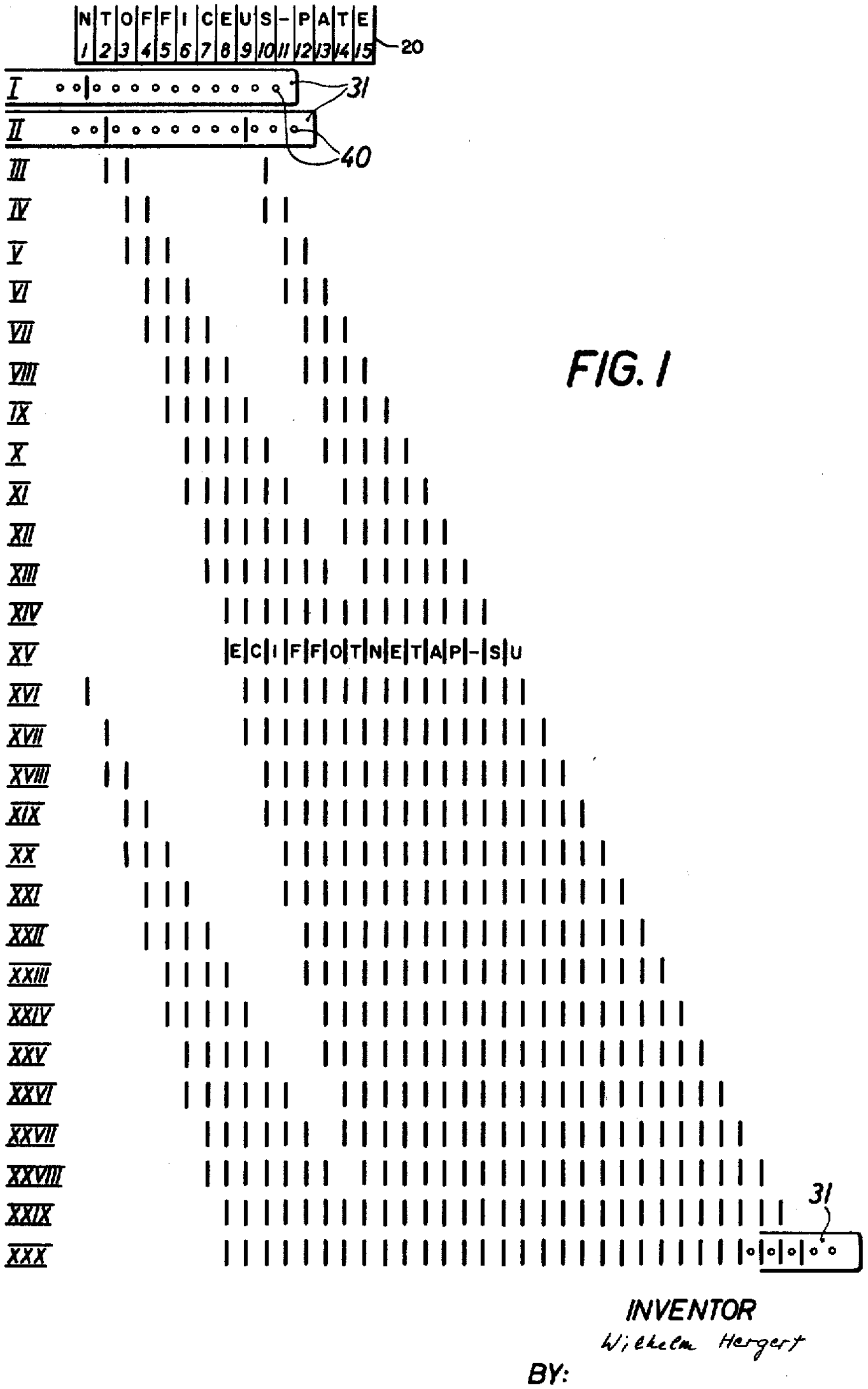
FIG. 1 is a diagrammatic illustration of the method according to the invention showing the relation between consecutive marking or read-out operations and the stations of the multi-station transfer device.

FIG. 1 illustrates diagrammatically the sequence of operations in carrying out the method according to the invention. A multi-station marking arrangement 20 comprises fifteen individual marking or punching stations 1–15 as indicated. Next to the arrangement 20 a strip or tape 31 is shown in what may be called its starting position at the moment I. In this position I of the tape 31 first the station 1 is actuated and produces in the tape 31 a perforation e.g. according to the five-element code, this perforation being indicated diagrammatically by a transverse line across the tape 31 opposite to the station 1.

After this first punching operation the tape 31 is moved forward by means of its feed holes 40 under the action of conventional transporting means a distance equal to the spacing between the punches of station 1 and the punches of station 2 so that now the first perforations are located transversely opposite the station 2. For the purposes of this explanation it has been assumed that the total information composed of fifteen bits is "US. PATENTOFFICE," and it is further assumed that the individual stations 1–15 are so connected with the storage from which this information is to be transferred to the tape 31 that the bits of information i.e. the individual letters of the above mentioned information are so transmitted to the stations 1–15 that these stations are respectively assigned to these bits of information as marked in every station above the respective reference numeral 1–15. Consequently the first perforations produced by the station 1 have marked or perforated the tape so that the letter N is recorded in the above mentioned place.

At the moment II, with the tape 31 being in the position shown in FIG. 1 in register with the reference II, now the perforating station 9 is actuated whereby a perforation as marked opposite the station 9 and representing the letter U is produced. Considering the spaces between the punches of adjacent punching stations as being equal to each other and to the steps carried out by the tape 31 during its movement and therefore also equal to the spaces between consecutive markings or groups of perforations in the tape when the entire information has been transferred, it can be seen that the station 9 is spaced from the first operated station 1 in forward direction of the tape movement $$+a=\frac{n+1}{2}$$

spaces. Since $n$ is the number of stations provided in the arrangement 20 the value of $+a$ is in this case 8.

After the second perforation by the station 9 the tape 31 is moved another step forward and at the moment III the station 2 is actuated adding to the previously made perforations a perforation as indicated in the row in register with the reference III. It can be seen that the station 2 now actuated is spaced from the preceding actuated station 9 $-b=a-1=7$ spaces in a direction opposite to the tape movement.

Hereafter the tape 31 is again moved one step forward and at the moment IV the station 10 is operated so as to produce a perforation representing the letter S. Station 10 is again spaced 8 spaces in forward direction from the preceding actuated station 2.

The further procedure can easily be recognized from the diagram of FIG. 1. After every perforation the tape 31 is moved one step forward and at the consecutive moments V–XV one perforation after the other is added to the previously made perforations by alternatingly actuating a station which is 8 spaces ahead in forward direction from the previously actuated station and then a station which is 7 spaces away in rearward direction from the station actuated just before. When the moment XV has been reached and the tape 31 has been moved fifteen steps forward the entire information that was stored in a storage device and applied to the individual stations 1–15 of the transfer arrangement 20 as marked in FIG. 1 are transferred to the tape. Accordingly, in FIG. 1 in the row of perforation symbols in register with the reference XV the entire information "US. PATENTOFFICE" is recorded in coded form by corresponding perforations on the tape 31. Since the tape is assumed to be moving from left to right the information is bound to read from right to left as shown. This is perfectly suitable because when the recorded information is to be read out from the tape the latter will again be moved from left to right through a reading out or sensing arrangement so that the recorded letters or bits of information will be sensed in proper sequence.

If one assumes that the storage device which cooperates with the transfer arrangement 20 has been supplied in the meantime sequentially with further bits of information, then the whole procedure described above would now repeat after the tape 31 has been moved to a position corresponding to the moment XVI. This means that now again first the station 1 of the arrangement 20 is actuated and produces a perforation as indicated at the left end of the row in register with the reference XVI. It is believed that it is not necessary to describe the ensuing procedure as it can be easily recognized from the lower portion of the diagram FIG. 1 in accordance with the rows of perforation symbols in alignment with the references XVI to XXX. In this manner a second group of fifteen bits of information or letters have been added to the first group of fifteen bits of information or letters described above. As can be seen from the row in register with the reference XXX the two recorded groups of fifteen perforations each follow each other consecutively and in regular sequence so that no difficulties can be expected when the recorded information is to be read out from the tape.

The manner in which information is stored in the storage device supplying the transfer arrangement 20 is of no importance for the present invention. For instance, if the storage device is an electronic storage device then the entire information composed of fifteen bits may be introduced simultaneously without loss of time immediately after the previously stored information has been completely transferred to the tape. However, it is also possible to introduce the new information bit-by-bit into the storage elements as they are successively emptied by the transfer of the respective bits of information to the tape.

FIG. 2 is a diagrammatic illustration of an arrangement according to the invention. It shows the circuit means which connect a storage 21 with the multi-station transfer arrangement 51. In this particular embodiment the transfer arrangement 51 is to be considered as being a marking arrangement in which the stations 1–15 may be punching or perforating stations as well as printing stations.

The record carrier or tape 31 is moved by a drive wheel 30 engaging the feed holes of the tape in the direction shown by the arrow past the marking stations 1–15. The drive wheel 30 is driven via a shaft 32 by suitable drive means e.g. a motor 33 connected at 34 to a source of supply of electric energy. Depending on the type and construction of the marking arrangement 51 the movement of the tape may be either continuously or stepwise. Since drive means of this type are entirely known no detailed description or illustration thereof appears to be necessary.

If, by way of example, the marking stations 1–15 are perforating stations of conventional type, then FIG. 2*a* will serve to illustrate the bottom view of station 1 showing five punches A and next to it a portion of a tape 31 already perforated and having a series of feed holes 40 and five groups of perforations B.

In the presently described example of a perforating arrangement 51 a series of dies 20' may be arranged below the tape 31 respectively opposite the corresponding perforating stations 1–15.

In this embodiment the storage arrangement 21 comprises fifteen storage elements $S_1$ to $S_{15}$. Since the presently described embodiment is based on the use of a five-element code and since each punching station 1–15 comprises five punches A, each of the storage elements $S_1$ to $S_{15}$ is connected by a five-wire line 21'', bundled together at 21', with the contact groups $K_1$–$K_{15}$, respectively, of a multiple switch arrangement 22. The switch arrangement 22 is of the rotary type and therefore the contact groups $K_1$ to $K_{15}$ are arranged equally spaced circumferentially on a stationary contact carrier ring 28.

An outer contact carrier ring 29 is arranged concentrically with the inner ring 28. On the outer ring 29 contact groups $O_1$ to $O_{15}$ are arranged, each group also having five individual contacts and each contact group on the outer ring 29 being radially aligned with the corresponding contact group on the inner ring 28. A rotary switch arm 24 is arranged to be rotatable about the center of the rings 28 and 29 and carries two groups of five brushes each 26 and 27, the group 26 being adapted to cooperate with the contact groups on the outer ring 29 and the group of brushes 27 being adapted to cooperate with the contact groups on the inner ring 28. The first brush of the group 26 is conductively connected with the first brush of the group 27, the second brush of the group 26 is conductively connected with the second brush of the group 27 and so on.

The arrangement is such that the switch arm 24 is rotated in synchronism with the movement of the tape 31. This can be achieved in various ways; for the sake of simplicity FIG. 2 shows that the switch arm 24 is connected directly by a shaft 23 with the shaft 32. In this manner it is assured that when the tape 31 is moved one step forward equal to the spacing between the punches of adjacent marking stations of the arrangement 51, the switch arm 24 moves from a position in which its brushes are in engagement with one set of radially aligned outer and inner contact groups of rings 29 and 28 to a position in which the just named brushes are in engagement with the next following set of radially aligned contact groups. From each contact group $O_1$ to $O_{15}$ five-wire connecting lines $L_1$ to $L_{15}$, respectively, are taken to the corresponding marking stations 1–15, respectively.

It is to be assumed that a given information composed of fifteen bits or letters is stored in the storage device 21 in the manner indicated at the right of the arrangement 21 in FIG. 2, the information consisting in this example of "US. PATENTOFFICE." The stored bits or letters are transferred sequentially in the sequence indicated by the reference numbers I to XV, i.e. in sequence from the element $S_1$ to $S_{15}$. Therefore, and for carrying out the above described method according to the invention, the contact group $O_1$ is connected by line $L_1$ with the station 1, the contact group $O_2$ is connected by line $L_2$ with the station 9, the contact group $O_3$ is connected by line $L_3$ with the station 2, and the contact group $O_4$ is connected by line $L_4$ with the station 10. The remaining contact groups of the outer ring 29 are similarly connected in the desired sequence with the remaining stations of the marking arrangement 51 in such a manner that during the rotation of the switch arm 24 the bits or letters stored in the storage 21 are sequentially transferred by actuating the marking stations in the sequence indicated by the reference numbers I–XV marked in FIG. 2 below the arrangement 51. The resulting distribution of the transferred bits or letters is indicated also within the arrangement 51.

It can be seen that in operation the rotary movement of the switch arm 24 in synchronism with the movement of the tape 31 will produce the desired transfer of the information stored in the storage 21 to the tape 31 exactly in the manner illustrated by FIG. 1.

In order to bring about desired sequence of punching operations as illustrated by FIG. 1 it appears to be necessary that the bits of information are stored in the storage arrangement 21 in the peculiar manner indicated at the right of the arrangement 21 in FIG. 2. This does not give rise to any difficulty because it is well known in the art to store bits of information in a multi-element storage device in any desired way. However, for the purpose of explanation FIG. 2*b* illustrates a very simple way of taking care of this detail. In the left portion of FIG. 2*b* the storage arrangement 21 is illustrated in the same manner as in FIG. 2 so as to contain the storage elements $S_1$ to $S_{15}$ with an indication of a series of letters or bits of information to be stored therein in accordance with the above mentioned example. In the right hand portion of FIG. 2*b* an input arrangement 600 is shown which is composed of fifteen input elements 601 to 615. As indicated, in this input arrangement the letters or bits of information may appear in their regular order as indicated. All that is necessary is to connect the individual input elements with the desired storage elements in the manner shown so that for instance element 601 is connected with element $S_2$, element 602 is connected with element $S_4$, element 602 is connected with element $S_4$ and so on. In this manner it is easy to arrange for individual bits of information appearing in the input arrangement 600 in regular order to be distributed into the storage elements of the storage arrangement 21 in the desired irregular sequence.

On the other hand, if it is for any reason desirable to store the bits of information in the storage arrangement 21 in regular order, then the connections between the individual storage elements $S_1$ to $S_{15}$ with the contact groups on the inner ring 28 by the lines 21'' may be arranged in a manner exactly corresponding to the connection system illustrated by FIG. 2*b* with the same effect.

It will be understood that the rotary switch arrangement according to FIG. 2 constitutes only one example of a suitable multiple switch device. Evidently, this electromechanical switch device 22 could be replaced by an equivalent electronic switching arrangement adapted to establish sequentially the same connection between storage 21 and transfer arrangement 51 in the desired sequence.

The storage arrangement 21 may be of any electronic or other type. Also, without departing from the spirit of the invention, amplifiers may be inserted between the storage arrangement 21 and the marking stations 51.

In FIG. 2 all the electromagnetically operated marking stations 1–15 are arranged on one side of the tape 31. In certain cases this is not entirely satisfactory on account of the space requirement of the individual marking station. It may be difficult to make the individual station so narrow and to arrange them so close next to each other that the perforation groups on the tape have the desired spacing from each other. In such a case an arrangement according to FIG. 3 is preferable in which alternatingly the consecutive punching stations are arranged on different sides of the tape 31. For instance, the stations 36 the serial numbers whereof are odd numbers are located on one side of the tape 31 while the stations 37 the serial numbers whereof are even numbers are arranged on the opposite side of the tape 31. Accordingly the respectively corresponding dies 38 and 39 are also arranged correspondingly on opposite sides of the tape 31.

While the above described and illustrated embodiments of the invention are based on the transfer of information from a storage to a record carrier, it is to be understood that the arrangement according to the invention could also be used in transferring information from a record carrier to a storage i.e. in reading out the recorded information. In this second application of the invention the general arrangement remains exactly the same and the above described illustrations FIGS. 1 and 2 apply accordingly, with one exception. Therefore FIG. 2*c* illustrates in what manner the marking arrangement 51 is to be replaced in this case by a read-out arrangement 51'. In this case the stations 1' to 15' are individual read-out stations and the group of dies 20' is replaced by a guide or contact plate 20'' extending along the path of the tape 31 so that information recorded in the form of groups of perforations of tape 31 can be read out by the stations 1' to 15' in a conventional manner and then transferred by the arrangement of FIG. 2 into the storage arrangement 21.

In certain cases a similar arrangement as FIG. 3 of the read-out stations of a read-out arrangement alternatingly on opposite sides of the path of the record carrier 31 may be used advantageously.

Finally it should be borne in mind that it is not necessary to use perforating stations which are completely stationary. It is also possible to use in connection with a continuously moving tape 31 conventional perforating devices in which the punches are moved in the direction of the tape movement or in which the punches themselves produce through their movement the feed movement of the tape. Such arrangements are well known in the art and do not require detailed description.

It will be understood that each of the elements described above, or two or more together, may also find a useful application in other types of a method and arrangement for transferring information between a storage and a record carrier differing from the types described above.

While the invention has been illustrated and described as embodied in a method and arrangement for transferring information between a storage and a record carrier by means of a multi-station transfer arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of transferring, by means of a multi-station information transfer device having an odd number of $n$ transfer stations with equal spaces therebetween, information composed of up to $n$ bits between a multi-station storage and an information record carrier adapted to carry bit markings and moving through said device, the spacing between adjacent ones of the bit markings representing the complete information corresponding to the spacing between adjacent transfer stations, the step of consecutively connecting, in synchronism with the movement of the record carrier past the transfer stations, the individual stations of the storage with the $n$ individual transfer stations one-by-one so as to activate the latter to effect bit-by-bit transfer of the information between the respectively connected storage and transfer stations, the sequence of said transfer stations which are thus sequentially activated being such that after the activation of the first transfer station those transfer stations are sequentially activated which are spaced from each other alternatingly $$+a=\frac{n-1}{2}$$

spaces in forward direction of the movement of the record carrier and $-b=a-1$ spaces in opposite direction, respectively, wherein $n$ is the number of said transfer stations, whereby $n$ bits of information are transferred bit-by-bit by $n$ activations of the respective transfer stations between the storage and the record carrier while the latter moves past said $n$ transfer stations.

2. In a method of transferring, by means of a multi-station information marking device having an odd number of $n$ marking stations with equal spaces therebetween, information composed of up to $n$ bits from a multi-station storage to an information record carrier adapted to carry bit markings and moving through said device, the spacing between adjacent ones of the bit markings representing the complete information corresponding to the spacing between adjacent marking stations, the step of consecutively connecting, in synchronism with the movement of the record carrier past the marking stations, the individual stations of the storage with the $n$ individual marking stations one-by-one so as to actuate the latter to effect bit-by-bit transfer of the information between the respectively connected storage and marking stations, the sequence of said marking stations which are thus sequentially actuated being such that after the actuation of the first marking station those marking stations are sequentially actuated which are spaced from each other alternatingly $$+a=\frac{n-1}{2}$$

spaces in forward direction of the movement of the record carrier and $-b=a-1$ spaces in opposite direction, respectively, wherein $n$ is the number of said marking stations, whereby $n$ bits of information are transferred bit-by-bit by $n$ actuations of the respective marking stations from the storage to the record carrier while the latter moves past said $n$ marking stations.

3. In a method of transferring, by means of a multi-station information read-out device having an odd number of $n$ read-out stations with equal spaces therebetween, information composed of up to $n$ bits from an information record carrier adapted to carry bit markings and moving through said device, to a multi-station storage, the spacing between adjacent ones of the bit markings representing the complete information corresponding to the spacing between adjacent read-out stations, the step of consecutively connecting, in synchronism with the movement of the record carrier past the read-out stations, the individual stations of the storage with the $n$ individual read-out stations one-by-one so as to activate the latter to effect bit-by-bit transfer of the information between the respectively connected storage and read-out stations, the sequence of said read-out stations which are thus sequentially activated being such that after the activation of the first read-out station those read-out stations are sequentially activated which are spaced from each other alternatingly $$+a=\frac{n-1}{2}$$

spaces in forward direction of the movement of the record carrier and $-b=a-1$ spaces in opposite direction, respectively, wherein $n$ is the number of said read-out stations, whereby $n$ bits of information are transferred bit-by-bit by $n$ activations of the respective read-out stations from the record carrier to the storage while the record carrier moves past said $n$ read-out stations.

4. In an information transfer arrangement including a storage device having a plurality of storage stations, a multi-station information transfer device having an odd number of $n$ transfer stations with equal spaces therebetween, an information record carrier movable through said transfer device and adapted to carry bit markings set apart from each other by spaces equal to those between said transfer stations, and means for moving said record carrier through said transfer device in a predetermined direction at a predetermined speed, for transferring information composed of up to $n$ bits between said storage device and said record carrier, in combination, circuit means between the individual stations of the storage device and the individual transfer stations, respectively, of the transfer device and including multiple-switch means changeable between a plurality of different circuit-closing conditions, consecutively connecting, in said different conditions, the individual stations of said storage device with the $n$ individual transfer stations one-by-one so as to activate the latter to effect bit-by-bit transfer of the information between the respectively connected storage and transfer stations, the sequence of said transfer stations which are thus sequentially activated being such that after the activation of the first transfer station those transfer stations are sequentially activated which are spaced from each other, alternatingly, $$+a=\frac{n-1}{2}$$

spaces in forward direction of the movement of said record carrier, and $-b=a-1$ spaces in opposite direction, respectively, wherein $n$ is the number of said transfer stations; and actuating means synchronized with the means for moving said record carrier for changing said multiple switch means consecutively between said different conditions in synchronism with said movement of said record carrier, so that $n$ bits of information are transferred bit-by-bit by $n$ activations of the respective transfer stations between said storage device and said record carrier while the latter is moved past said $n$ transfer stations.

5. In an information transfer arrangement including a storage device having a plurality of storage stations, a multi-station information transfer device having an odd number of $n$ marking stations with equal spaces therebetween, an information record carrier movable through said transfer device and adapted to carry bit markings set apart from each other by spaces equal to those between said marking stations, and means for moving said record carrier through said transfer device in a predetermined direction at a predetermined speed, for transferring information composed of up to $n$ bits from said storage device to said record carrier, in combination, circuit means between the individual stations of the storage device and the individual marking stations, respectively, of the transfer device and including multiple-switch means changeable between a plurality of different circuit-closing conditions, for consecutively connecting, in said different conditions, the individual stations of said storage device with the $n$ individual marking stations one-by-one so as to actuate the latter to effect bit-by-bit transfer of the information between the respectively connected storage and marking stations, the sequence of said marking stations which are thus sequentially actuated being such that after the actuation of the first marking station those marking stations are sequentially actuated which are spaced from each other, alternatingly, $$+a=\frac{n-1}{2}$$

spaces in forward direction of the movement of said record carrier, and $-b=a-1$ spaces in opposite direction, respectively, wherein $n$ is the number of said marking stations; and actuating means synchronized with the means for moving said record carrier for changing said multiple switch means consecutively between said different conditions in synchronism with said movement of said record carrier, so that $n$ bits of information are transferred bit-by-bit by $n$ actuations of the respective marking stations from said storage device to said record carrier while the latter is moved past said $n$ marking stations.

6. In an information transfer arrangement including a storage device having a plurality of storage stations, a multi-station information transfer device having an odd number of $n$ read-out stations with equal spaces therebetween, an information record carrier movable through said transfer device and adapted to carry bit markings set apart from each other by spaces equal to those between said read-out stations, and means for moving said record carrier through said transfer device in a predetermined direction at a predetermined speed, for transferring information composed of up to $n$ bits from said record carrier to said storage device, in combination, circuit means between the individual stations of the storage device and the individual read-out stations, respectively, of the transfer device and including multiple-switch means changeable between a plurality of different circuit-closing conditions, for consecutively connecting, in said different conditions, the individual stations of said storage device with the $n$ individual read-out stations one-by-one so as to activate the latter to effect bit-by-bit transfer of the information between the respectively connected storage and read-out stations, the sequence of said read-out stations which are thus sequentially activated being such that after the activation of the first read-out station those read-out stations are sequentially activated which are spaced from each other, alternatingly, $$+a=\frac{n-1}{2}$$

spaces in forward direction of the movement of said record carrier, and $-b=a-1$ spaces in opposite direction, respectively, wherein $n$ is the number of said read-out stations; and actuating means synchronized with the means for moving said record carrier for changing said multiple switch means consecutively between said different conditions in synchronism with said movement of said record carrier, so that $n$ bits of information are transferred bit-by-bit by $n$ activation, of the respective read-out stations from said record carrier to said storage device while said record carrier is moved past said read-out stations.

7. An arrangement as claimed in claim 5, wherein said multiple-switch means is a rotary multiple-switch device movable between a plurality of circuit-closing positions adapted to establish in said different positions respectively different connections between selected stations of said storage device and selected marking stations, and wherein said actuating means are operatively connected with said multiple-switch device for moving the latter through said different circuit closing positions.

8. An arrangement as claimed in claim 6, wherein said multiple-switch means is a rotary multiple-switch device movable between a plurality of circuit-closing positions adapted to establish in said different positions respectively different connections between selected stations of said storage device and selected read-out stations, and wherein said actuating means are operatively connected with said multiple-switch device for moving the latter through said different circuit closing positions.

9. An arrangement as claimed in claim 5, wherein said marking stations are arranged on one side of the path of said record carrier movable through said transfer device.

10. An arrangement as claimed in claim 6, wherein said read-out stations are arranged on one side of the path of said record carrier movable through said transfer device.

11. An arrangement as claimed in claim 5, wherein said marking stations are alternatingly arranged on opposite sides of the path of said record carrier movable through said transfer device.

12. An arrangement as claimed in claim 6, wherein said read-out stations are alternatingly arranged on opposite sides of the path of said record carrier movable through said transfer device.

13. An arrangement as claimed in claim 4, wherein said transfer stations are stationary.

14. An arrangement as claimed in claim 4, wherein said transfer stations include means for temporarily moving at least a portion thereof for compensating for the movement of said record carrier during a transfer operation.

15. An arrangement as claimed in claim 5, wherein said transfer device comprises a plurality of perforating stations each including a plurality of perforating punches movable upon actuation of the respective perforating station so as to cause a stepwise movement of said record carrier.

References Cited in the file of this patent

UNITED STATES PATENTS 3,029,120 Bud ------------------ Apr. 10, 1962